United States Patent
Klink

(10) Patent No.: US 12,151,956 B2
(45) Date of Patent: Nov. 26, 2024

(54) DEVICE FOR DISINFECTING A FLUID

(71) Applicant: HYTECON AG, Lucerne (CH)

(72) Inventor: Maximilian Klink, Lucerne (CH)

(73) Assignee: HYTECON AG, Lucerne (CH)

( * ) Notice: Subject to any disclaimer, the term of this patent is extended or adjusted under 35 U.S.C. 154(b) by 179 days.

(21) Appl. No.: 17/777,192

(22) PCT Filed: Mar. 3, 2021

(86) PCT No.: PCT/EP2021/055272
§ 371 (c)(1),
(2) Date: May 16, 2022

(87) PCT Pub. No.: WO2021/190886
PCT Pub. Date: Sep. 30, 2021

(65) Prior Publication Data
US 2023/0055000 A1 Feb. 23, 2023

(30) Foreign Application Priority Data
Mar. 25, 2020 (DE) ...................... 10 2020 108 265.7

(51) Int. Cl.
*C02F 1/32* (2023.01)
(52) U.S. Cl.
CPC ........ *C02F 1/325* (2013.01); *C02F 2201/003* (2013.01); *C02F 2201/3222* (2013.01);
(Continued)
(58) Field of Classification Search
CPC ...... C02F 1/32; C02F 1/46; C02F 1/36; C02F 1/48; C02F 1/72; C02F 1/42
See application file for complete search history.

(56) References Cited

U.S. PATENT DOCUMENTS

2005/0023482 A1 2/2005 Schulz
2010/0310433 A1 12/2010 Nyberg et al.
(Continued)

FOREIGN PATENT DOCUMENTS

CN 1655828 A 8/2005
CN 105 822 923 A 8/2016
(Continued)

OTHER PUBLICATIONS

International Search Report (English and German) and Written Opinion (German) of the International Search Authority issued in PCT/EP2021/055272, mailed on Jun. 10, 2021; ISA/EP.
(Continued)

*Primary Examiner* — Walter D. Griffin
*Assistant Examiner* — Cameron J Allen

(57) ABSTRACT

A device (20) for disinfecting a fluid, in particular water, has a reactor housing (15) with an inlet (19) for ingress and an outlet (9) for discharge of a fluid to be disinfected, wherein a reactor chamber (16) is formed in the reactor housing (15). The fluid to be disinfected flows through the reactor chamber (16) from the inlet (19) to the outlet (9) along a flow path (18). A UV irradiation device (21) with a plurality of UV LEDs (11) is provided, wherein the UV LEDs (11) are disposed on an elongated support element (7) and the support element (7) is configured to extend at least partially into the reactor housing (15) so that by means of the UV LEDs (11), UV light for disinfecting the fluid can irradiate the flow path in the reactor chamber. The support element (7) is releasably and exchangeably mounted in the reactor housing (15) and has a coolant passageway (5, 17) which extends through the support element (7) and through which a coolant can flow in order to cool the UV LEDs (11).

12 Claims, 9 Drawing Sheets

(52) U.S. Cl.
CPC .............. *C02F 2201/3228* (2013.01); *C02F 2301/026* (2013.01); *C02F 2303/04* (2013.01)

(56) References Cited

U.S. PATENT DOCUMENTS

| | | | | |
|---|---|---|---|---|
| 2011/0076196 | A1* | 3/2011 | Chittka | .............. C02F 1/325 |
| | | | | 313/484 |
| 2015/0158741 | A1 | 6/2015 | Lee et al. | |
| 2015/0284266 | A1 | 10/2015 | Matsui | |

FOREIGN PATENT DOCUMENTS

| | | |
|---|---|---|
| CN | 109 052 553 A | 12/2018 |
| DE | 10 2014 012217 A1 | 2/2016 |
| DE | 10 2017 117 324 A1 | 1/2019 |
| GB | 0507460 | 8/1938 |
| JP | 201875572 A | 5/2018 |
| JP | 201998291 A | 6/2019 |
| KR | 10-2013-0106993 A | 10/2013 |
| WO | WO-2016026576 A1 | 2/2016 |
| WO | WO-2019014770 A1 | 1/2019 |
| WO | WO-2019/025199 A1 | 2/2019 |

OTHER PUBLICATIONS

Extended European Search Report issued in EP 21160480.6, mailed on Jul. 8, 2021.
Korean Office Action regarding Application No. 10-2022-7018737, mailed May 2, 2024.

\* cited by examiner

DEVICE FOR DISINFECTING A FLUID

CROSS-REFERENCE TO RELATED APPLICATIONS

This application is a 371 U.S. National Phase of International Application No. PCT/EP2021/055272, filed Mar. 3, 2021, which claims priority to German Patent Application No. 10 2020 108 265.7, filed Mar. 25, 2020. The entire disclosures of the above applications are incorporated herein by reference.

The invention relates to a device for disinfecting a fluid, in particular water.

BACKGROUND

Devices for the treatment of water are known, in particular devices for disinfecting water, for example in order to provide clean drinking water. The water to be disinfected which, for example, has been contaminated by microorganisms, is introduced into a reactor chamber, disinfected in it and after disinfection, leaves the reactor chamber for further use. In addition to a chemical treatment, an effective means for eliminating the microorganisms is to irradiate the water with ultraviolet light (UV light). As an example, UV light is produced by means of mercury vapour lamps and emitted into the reactor chamber so that the water flowing through it is exposed to the UV light.

Devices for the treatment of water with UV are known from US 2015/0158741 A1, for example, examples being as an attachment for a water tap or as an insert for a vessel. Water can be disinfected by means of UV light which is produced by means of UV LEDs. The UV LEDs can be disposed on a support element which is mounted in a cartridge so that it extends into a reactor chamber from one side. Other filters apart from the UV water treatment may be provided.

SUMMARY

The objective of the invention is to provide an improved device for disinfecting a fluid.

The solution is provided by means of a device with the features of the independent claim 1. Further embodiments and advantageous exemplary embodiments form the subject matter of the dependent claims.

According to one aspect, a device for disinfecting a fluid, in particular water, is provided, which has the following: a reactor housing with an inlet for ingress and an outlet for discharge of a fluid to be disinfected; a reactor chamber which is formed in the reactor housing and is configured to receive the fluid to be disinfected so that the fluid flows through the reactor chamber along a flow path from the inlet to the outlet; a UV irradiation device with a plurality of UV LEDs; and an elongated support element on which the UV LEDs are disposed and which is configured to extend at least partially into the reactor housing so that by means of the UV LEDs, UV light can be emitted into the reactor chamber along the flow path in order to disinfect the fluid. The support element is releasably and exchangeably mounted in the reactor housing and has a coolant passageway which extends through the support element and through which a coolant can flow in order to cool the UV LEDs.

The elongated support element enables the UV LEDs to be distributed along the flow path so that the fluid to be disinfected is exposed to the UV light for a sufficiently long period. The support element is releasably mounted in the reactor housing; in other words, it can be removed from the reactor housing and inserted back in again, for example for the purposes of maintenance or repair, or be changed in order to change the UV irradiation device for another, for example because of ageing of the light source or in exchange for an irradiation device with a different number and/or arrangement of UV LEDs, of UV LEDs with a different wavelength or the like. Efficient treatment of water by means of the UV light is also ensured because despite the exchangeability of the UV light source, cooling of the UV LEDs with a desired coolant, in particular a liquid coolant such as water, is provided.

At least a portion of the support element may be formed by a thermally conductive material, so that heat generated from the operation of the UV LEDs can be transmitted to a coolant which flows through the coolant passageway and is dissipated in this manner. In particular, the support element may consist of aluminium. Other materials, in particular metals with a higher thermal conductivity, may also be used.

The support element may be mounted in the reactor housing in a manner such that inside the reactor housing, it extends at a distance from a reactor housing wall so that UV light from the UV LEDs can be emitted in the direction of the reactor housing wall.

The support element may extend along a central longitudinal axis of the reactor chamber, so that the UV light can be emitted from the inside to the outside. In this regard, the UV LEDs may be uniformly distributed on the support element in the circumferential direction of the support element. Because of the internal, in particular central arrangement of the UV light source, this means that a uniform irradiation of the fluid to be disinfected can be obtained with only one light source. It should be understood that a plurality of light sources may also be provided. These can also be installed in a manner so as to be exchangeable, or in fact they may also be installed securely and constructed differently.

The support element may be configured, i.e. appropriately dimensioned and shaped, to extend in a longitudinal direction through the entire reactor housing or the reactor chamber. This means that the UV light source may extend over the entire length of the reactor chamber. It should be understood that alternatively, it may also be shorter, i.e. it may extend over only a portion of the length of the reactor chamber.

The support element may be formed rod-shaped. It may be polygonal or round in cross section. As an example, the support element may be triangular, quadrangular, pentangular, hexagonal etc. in cross section, in which case UV LEDs may be disposed on each of the sides, for example on an appropriate support module.

In order to cool the UV LEDs, as mentioned above, a coolant passageway is provided in the support element. This may extend from a coolant inlet to a coolant outlet which are both disposed at the same end of the support element. This simplifies the connection of a coolant circuit and therefore in particular also simplifies the exchange capability of the UV light source.

The coolant passageway may have a first section which extends from the coolant inlet and comprise a second section which extends to the coolant outlet, wherein the first or "infeed" section may run inside the second or "drain" section. Thus, the coolant can flow along the entire circumference on the rear side of the UV LEDs, for effective cooling. This arrangement also facilitates the escape of air from the coolant passageway.

The coolant may be the fluid to be disinfected itself, which cools the support element, i.e. the cooling element, before or after disinfection and is recycled to the circuit. In addition, an external cooling circuit may be used for cooling, which contains a separate cooling apparatus or is connected to the fluid to be disinfected via a heat exchanger in order to remove the heat in this manner. Particularly in the case of using an external cooling circuit, it is also possible to use warm water, for example in order to inactivate *Legionella*.

A quartz glass tube may be provided which is configured to surround the support element in order to prevent direct contact of a fluid to be disinfected with the UV LEDs. The quartz glass tube therefore forms a cladding tube to protect the UV LEDs. In particular, the quartz glass tube forms an internal boundary of the reactor chamber which surrounds the quartz glass tube and the UV light source disposed in the quartz glass tube while the reactor housing wall forms an outer boundary of the reactor chamber. Like the support element with the UV LEDs, the quartz glass tube may also be exchangeable, in particular exchangeable together with the support element. As an alternative, it may also be securely fastened in the reactor housing. In particular, cleaning of the quartz glass tube is usually not necessary, because the formation of a deposit on the quartz glass usually does not occur because, in contrast to gas discharge lamps, LEDs remain cold on the side facing the reactor chamber and therefore do not heat up the quartz glass.

It should be understood that, independently of the above, both mechanical as well as chemical cleaning of the device could be made possible, for example by means of flanges, connection pieces and the like which can be unscrewed. As an example, the reactor housing may be provided with connections for cleaning agents such as chlorine or ozone.

The reactor housing may be configured as a flow tube, wherein the inlet may be disposed at a first end of the flow tube and the outlet may be disposed at an opposite second end of the flow tube. The reactor housing may be configured in a manner such that flow can take place in both directions, i.e. the inlet and outlet may be exchanged, depending on the use.

At least one of the inlet and the outlet, preferably both the inlet and the outlet, is or are preferably disposed laterally on the reactor housing so that a fluid to be disinfected flows through the reactor chamber in a manner such that the flow path passes around the support element in a spiral shape. The fluid to be disinfected can therefore flow multiple times by or around the UV light source, whereupon a high dose of UV can be applied. Particularly in the case in which the inlet is disposed laterally on the reactor housing, the fluid may flow into the reactor in at least a partially tangential direction in order to support the formation of the spiral-shaped flow.

The inlet and outlet may both be directed in the same transverse direction, in particular perpendicular to the longitudinal axis. In this regard, the inlet and outlet may be substantially congruent in top view in the longitudinal direction, i.e. in the same position along the circumference of the reactor housing, or they may be offset. However, the inlet and outlet may also be directed in different directions transverse to the longitudinal axis of the reactor housing. Advantageously, the inlet and the outlet are also disposed here in a manner such that a spiral-shaped flow is formed in the reactor chamber.

As an alternative, only the inlet or only the outlet may be transverse, in particular perpendicular to the longitudinal axis, preferably disposed in a tangential direction, and correspondingly, the other of the inlet and outlet may run in the longitudinal direction, in particular along the central longitudinal axis. The inlet and/or the outlet may be formed in an appropriate connection piece which has a continuously varying cross sectional surface along the direction of flow. In other words, in order to improve the flow, the connection pieces may be rounded, in particular for the case in which the appropriate connection is directed in the longitudinal direction. In this case as well, the inlet and outlet are disposed in a manner such that the flow in the reactor chamber is in the shape of a spiral.

A surface of the reactor housing which borders the reactor chamber, i.e. in particular its inside, may be formed at least in part from a material which diffusely reflects UV light. The UV radiation which passes through the water from the inside to the outside can therefore be diffusely reflected from reflective surfaces, so that the UV light can act multiple times on the flowing fluid. As an example, the inside of the reactor housing may be coated with PTFE, wherein advantageously, the thickness of the layer of PTFE is at least 1 mm. In contrast, the reactor housing itself may be constructed from water-resistant and UV-resistant and structurally stable materials such as stainless steel or plastic.

Furthermore, the device may have at least one UV sensor for detecting an intensity of radiation of the UV light emitted by the UV LEDs. Furthermore, an analysis unit may be provided which is configured to control the intensity of radiation as a function of a signal from the UV sensor. In particular, an automatic radiation detector may be provided, wherein operating hours are monitored and controlled, and an indication or alarm may be emitted in the event of exceeding a maximum service period. RFID technology may be employed for the control.

For monitoring the radiation intensity and outputting the intensity, the UV sensors may be configured in $W/m^2$ and connected to the analysis unit. It can convert the radiation intensity into a UV dose by integrating over time and also detect any changes in the water quality such as, for example, deterioration of the UV transmission or the formation of a coating on the quartz glass cladding tube and/or the reactor housing wall. The radiant power may be adjusted by means of the analysis unit and also by means of the power supply. The position and number of the sensors may be varied in correspondence with the application. The sensors may be changed during the operation. As an example, they may be introduced through a hole in the reactor or be disposed on a support module for the LEDs. Thus, the UV sensors can detect either the direct radiation when they are located in the reactor, or after passing through the fluid twice when they are attached to the support module. Because the radiation field is homogeneous because of the UV LEDs, starting from values detected in the sensor zone, the analysis unit can extrapolate these values over the entire homogeneous UV radiation field. It is then possible to provide that the analysis unit will emit an alarm when the UV intensity drops below a minimum value.

DESCRIPTION OF EXEMPLARY EMBODIMENTS

The invention will now be described in more detail with reference to the drawings. In the drawings.

Figure 1:
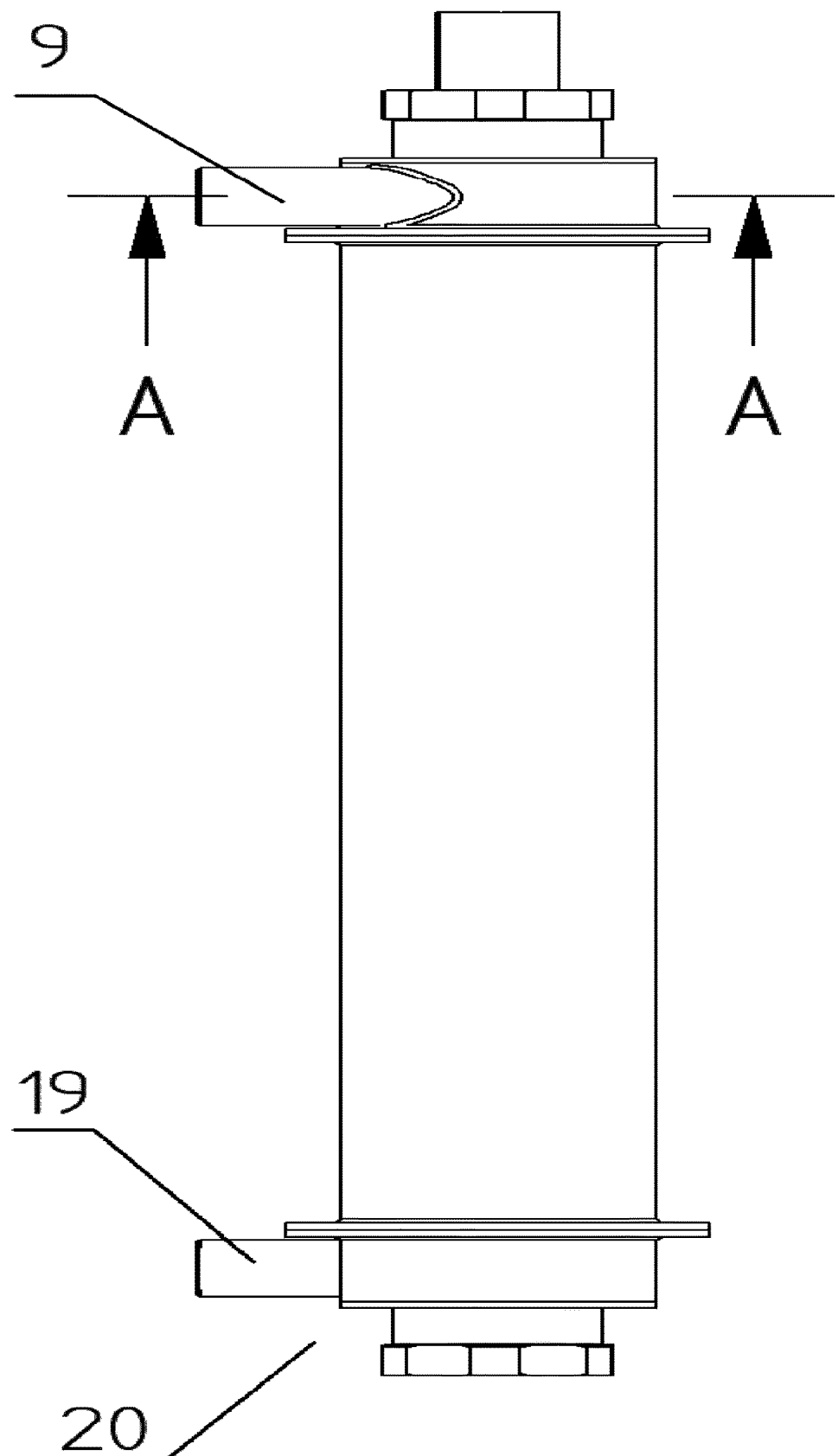
FIG. 1 shows a side view of a device for disinfecting a fluid in accordance with a first exemplary embodiment.
Figure 2:
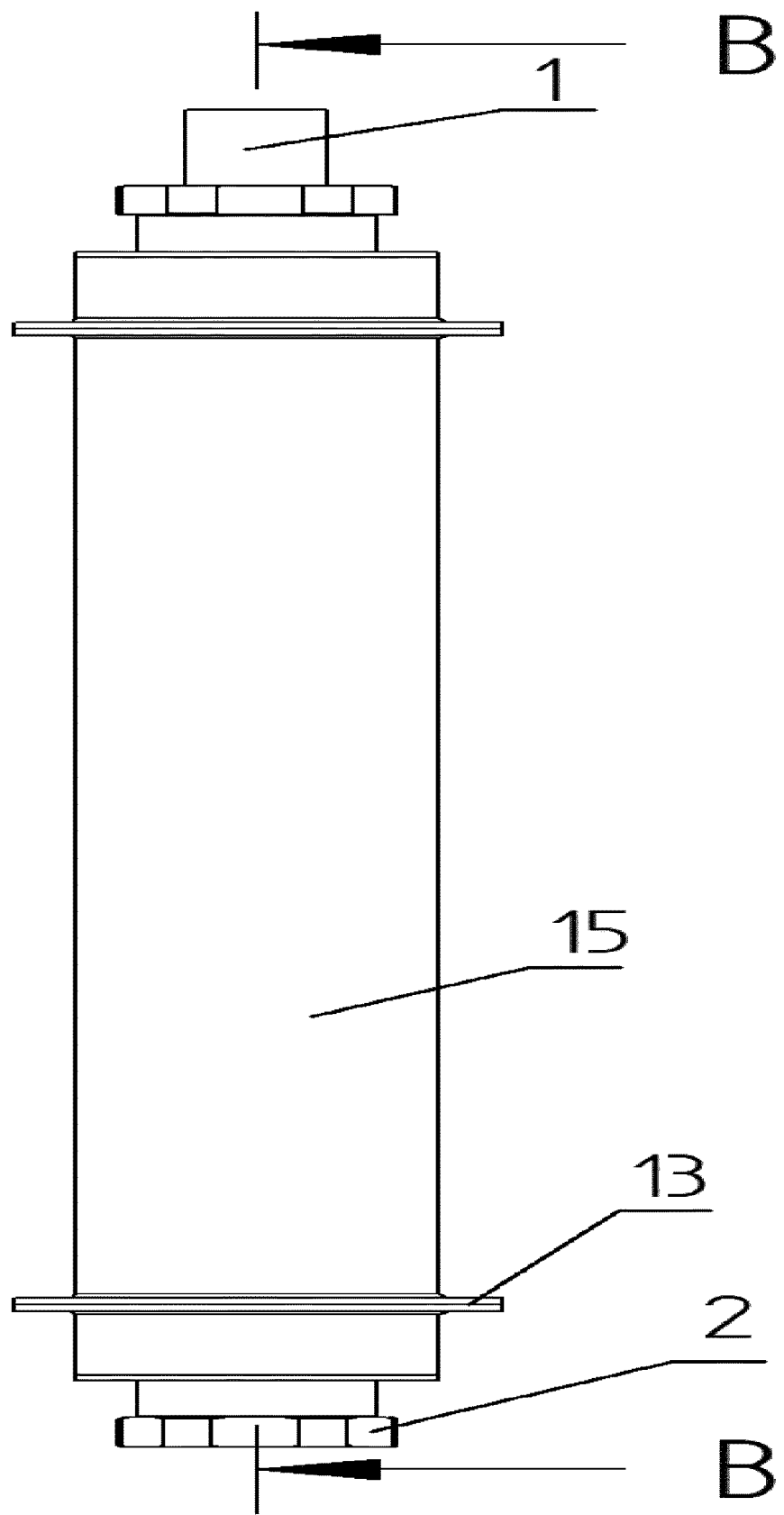
FIG. 2 shows a further side view of the device of FIG. 1.
Figure 3:
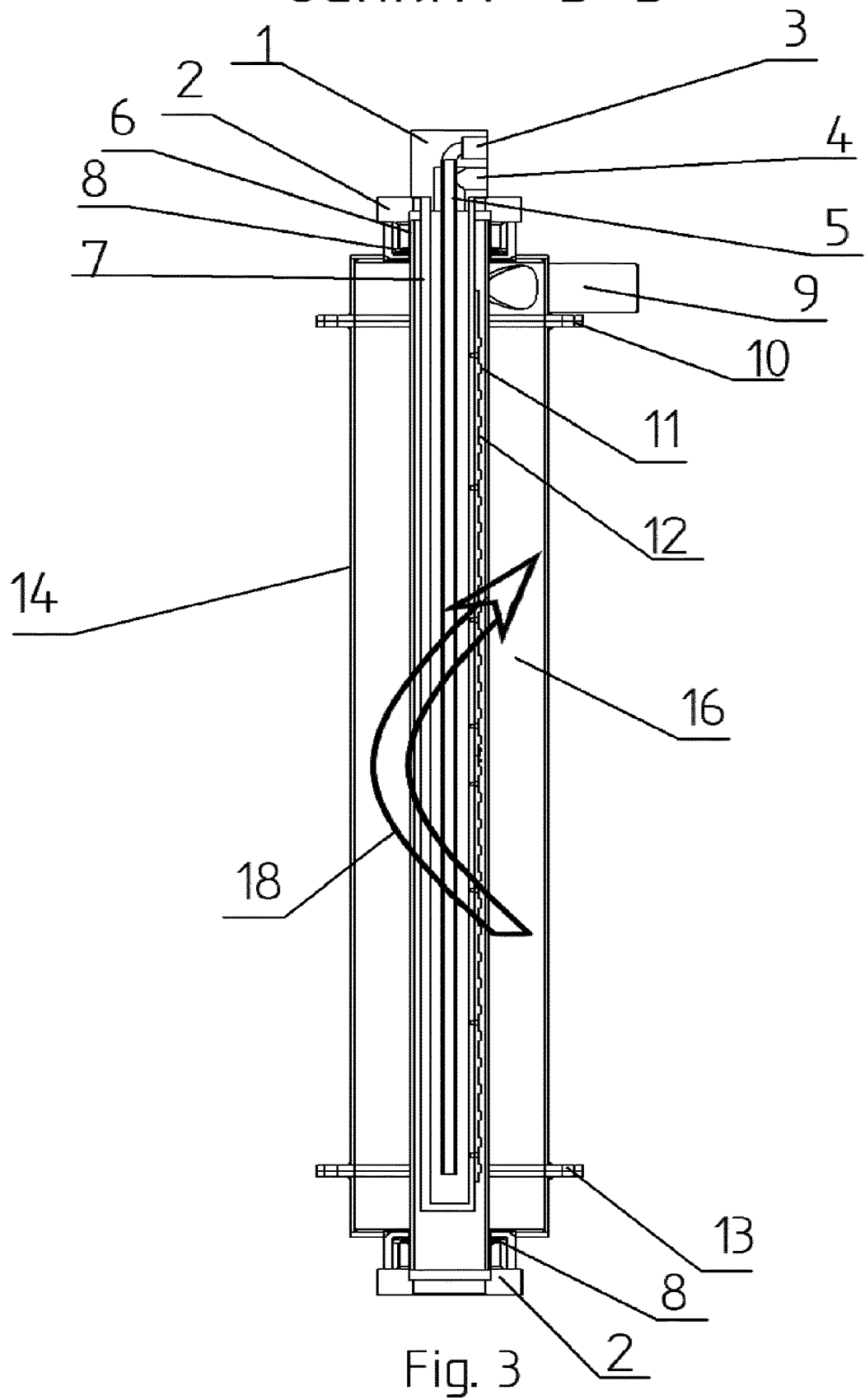
FIG. 3 shows a sectional view of the device of FIG. 1 along the longitudinal axis.

A first exemplary embodiment of a device 20 for disinfecting a fluid, in particular water, will be described below with reference to FIGS. 1 to 7.

The device 20, which is also described as a reactor, is configured as a flow tube with a tubular reactor housing 15. A fluid to be disinfected, such as water, is introduced via an inlet 19 into a reactor chamber 16 formed by the reactor housing 15 and leaves it via the outlet 9 following successful disinfection. The function of the inlet and outlet may also be interchanged. The device 20 may be operated horizontally as well as vertically. As an example, the flow tube may have a length of 30 cm to 100 cm, preferably 50 cm to 60 cm, and a diameter of 5 cm to 10 cm. In particular, it may be provided for installation in a water supply system. In the exemplary embodiment shown here, the connections for the inlet 19 and the outlet 9 are disposed in corresponding end pieces which are connected via screw flanges 10, 13 to the tubular portion of the reactor housing 15 which is formed by a wall 14.

Because of the lateral arrangement of the inlet 19 and outlet 9, the water is introduced into the reactor chamber 16 in a tangential direction (see section in FIG. 4), whereupon a spiral-shaped flow, i.e. flow path 18 (see arrow in FIG. 3) is produced. The spiral-shaped (helical) flow can form not only because of the arrangement of the inlet 19 and outlet 9, in particular also because the cross section of the reactor chamber 16 is preferably substantially circular. In addition, fluid guide elements (not shown) may be provided in the reactor chamber 16 in order to optimise the hydraulic system and with this to extend the residence time for the fluid to be disinfected in the reactor 20, in order to optimize the use of the UV illumination for disinfection.

Figure 4:
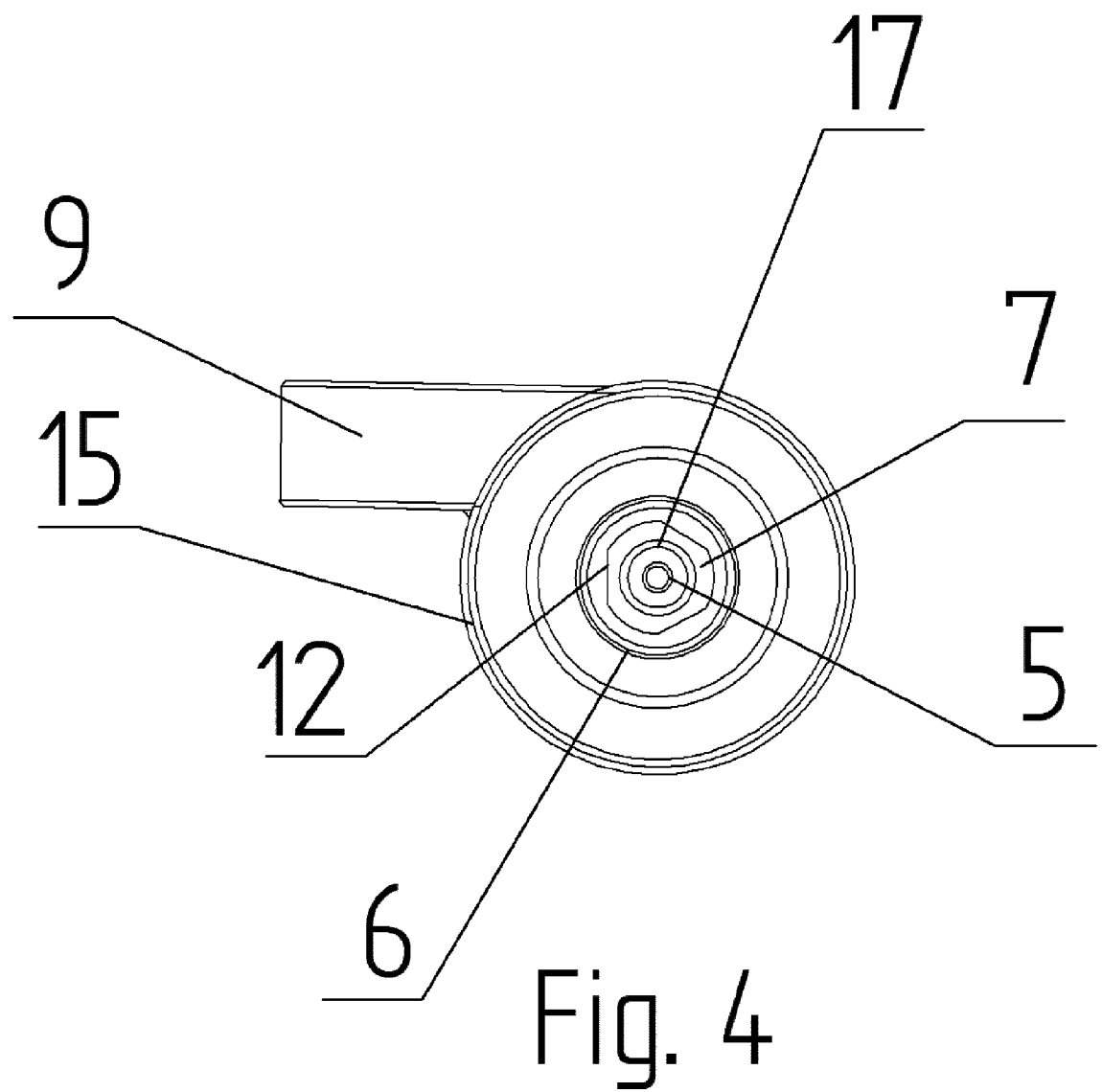
FIG. 4 shows a sectional view of the device of FIG. 1 in the transverse direction.
Figure 5:
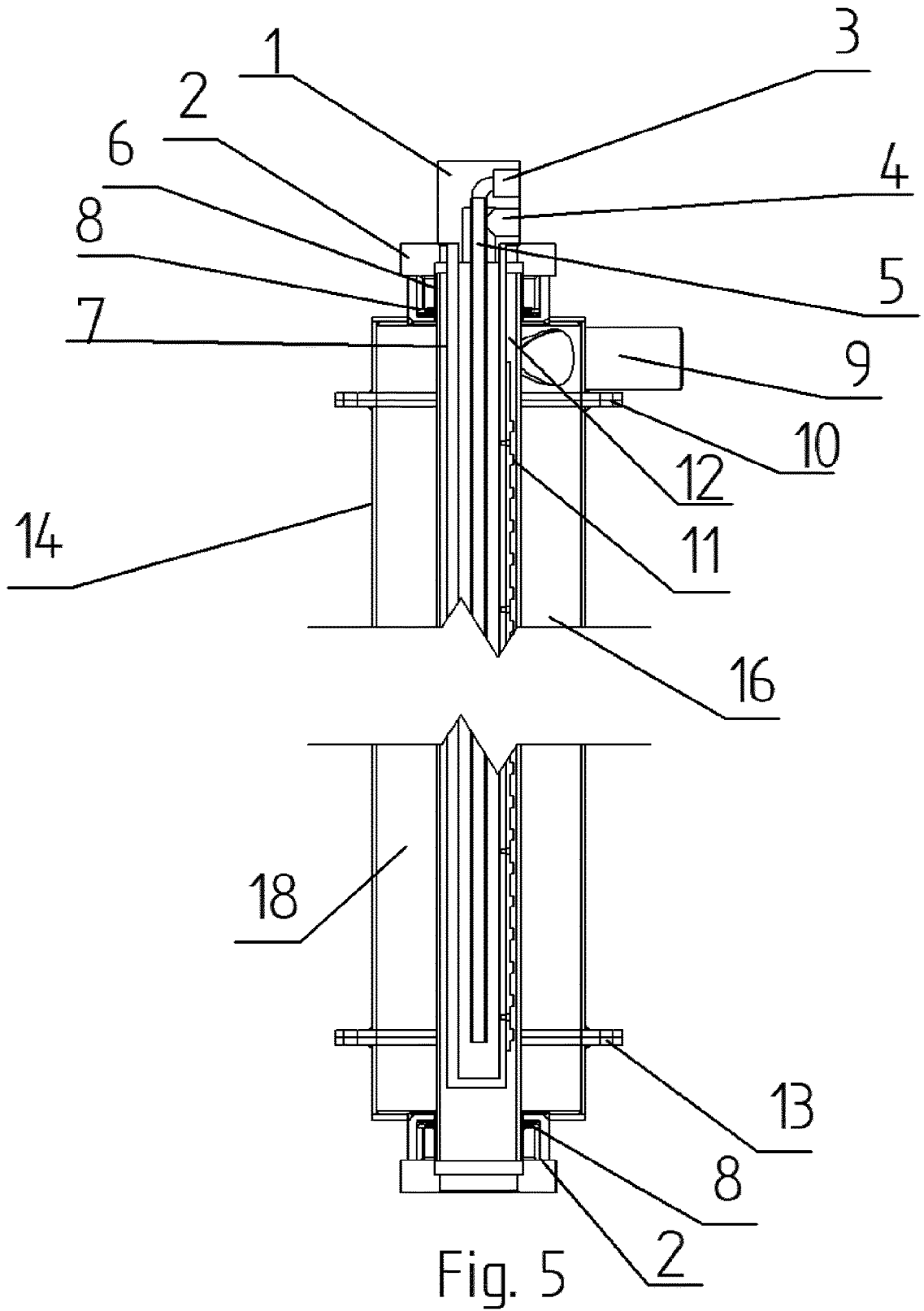
FIG. 5 shows an enlarged section of FIG. 3.

The UV light is produced by means of a UV light source 21 (see FIG. 6), which is releasably mounted in the reactor housing 15, i.e. it can be exchanged. UV LEDs 11 are provided on appropriate support modules 12 which are disposed on a rod-shaped cooling element 7. As can be seen in FIG. 4, in this exemplary embodiment, three support modules 12 are distributed uniformly around the circumference of the cooling element 7. They respectively extend along the length of the cooling element 7 (see FIG. 6). In order to protect the LEDs 11 and also to act as an inner border of the reactor chamber 16, a quartz glass tube 6 is provided which surrounds the UV light source 21.

The number and power as well as the position of the LEDs 11 can be varied and can therefore be adjusted to the required cleaning and disinfecting power. The LEDs 11 can produce UV light of different wavelengths in the range from 240 to approximately 400 nm and can therefore be tailored to disinfect specific microorganisms. In addition, the LEDs 11 can be dimmed. By irradiating at different wavelengths, the disinfecting power of various microorganisms which are present in water at the same time can be increased. Preferably, the UV light source 21 is flexible in construction, so that it may, for example, be extendable in a modular manner. The rod-shaped UV light source 21 may be supplied with current via a direct connection, or it may be supplied by induction.

In this exemplary embodiment, the UV light source 21, i.e. in particular the cooling element 7, extends over the entire length of the reactor chamber 16 along its central longitudinal axis. The UV LEDs 11 are likewise disposed substantially along the entire length, so that the flow path 18 is completely irradiated. The UV light is emitted from the inner UV light source 21 radially outwards in the direction of the housing wall 14. This is preferably coated with a suitable material, for example PTFE, on its inner surface, in order to diffusely reflect the UV light so that after reflection, it can act on the water again.

Figure 6:
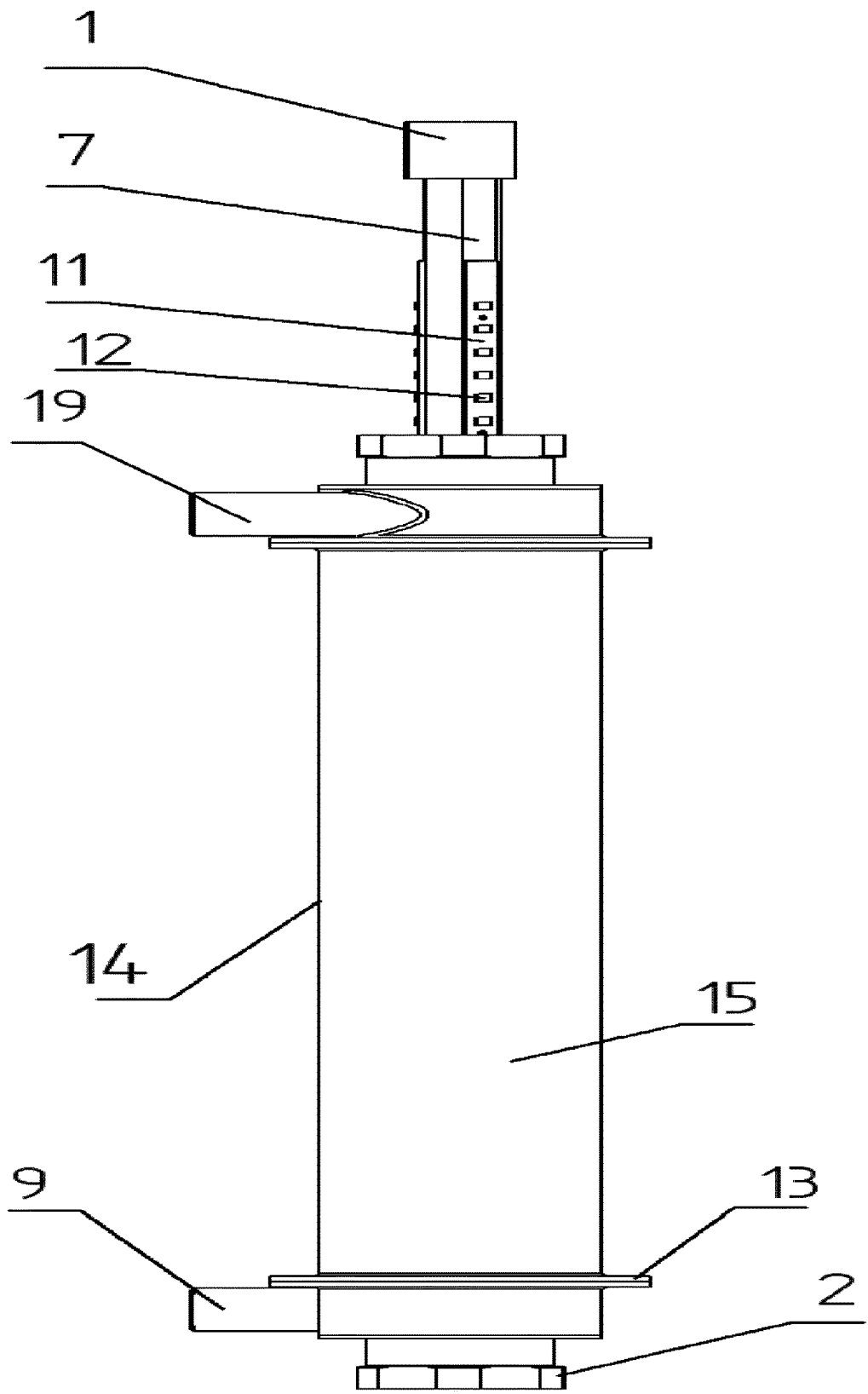
FIG. 6 shows a side view of the device of FIG. 1 with a partially withdrawn light source.
Figure 7:
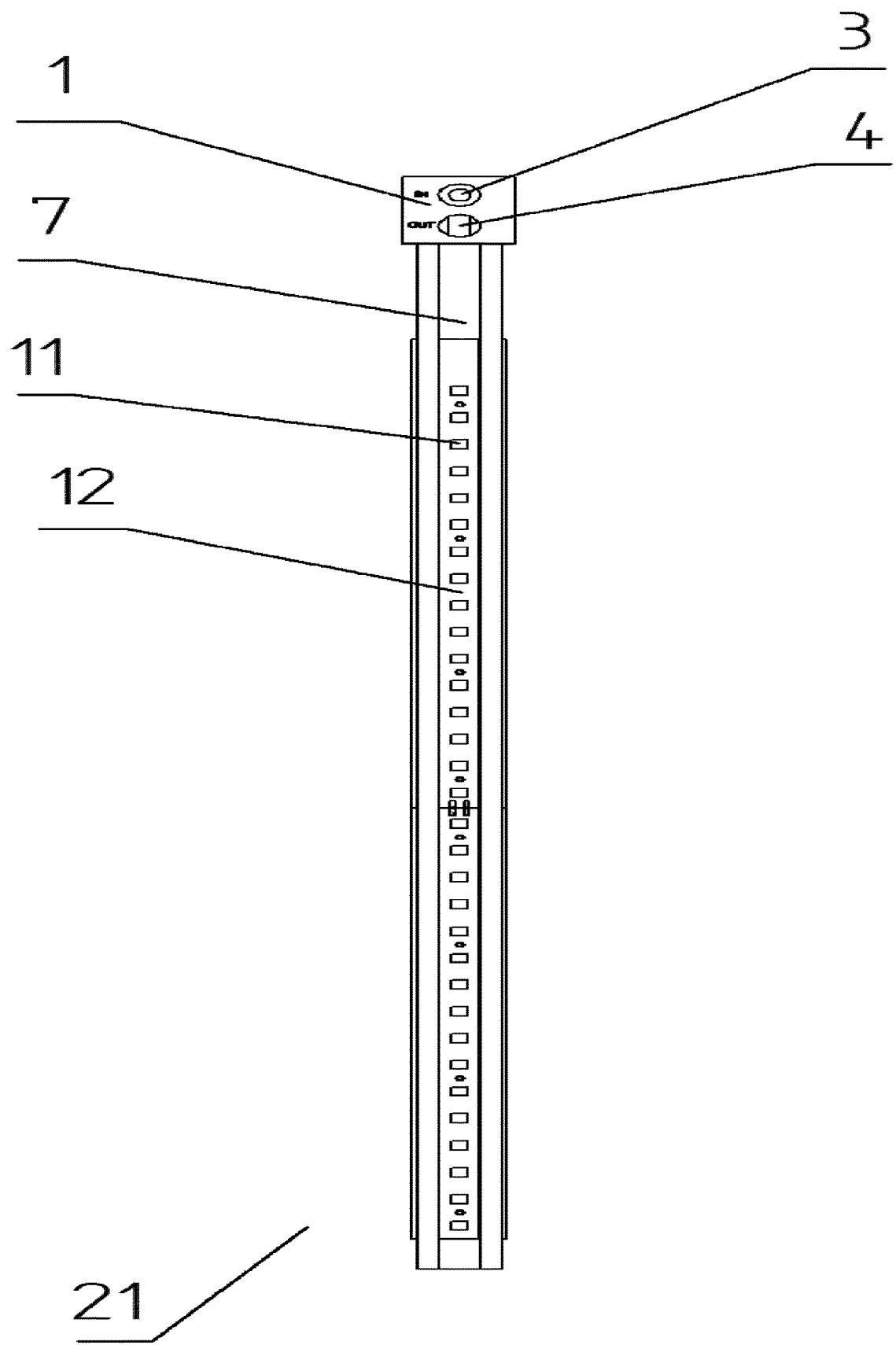
FIG. 7 shows a rod-shaped light source.

Screw flanges 2 are provided at both ends of the cooling element 7 so that the cooling element can be secured by tightening the screw flange 2 at both sides of the reactor housing 15. It should be understood that other suitable mechanisms for fastening may be envisaged. By loosening the screw flange 2, the cooling element 7 with the UV LEDs 11 disposed thereon can be removed from the reactor housing 15. This enables the UV light source 21 to be changed easily without dismantling the reactor 20 further. The accessibility of the cooling element 7 from both sides provides for more freedom when installing the reactor 20, for example in a water supply system. Seals 8 are provided in order to seal the reactor chamber 16 at the corresponding openings through which the UV light source 21 is introduced into the reactor housing 15 or removed therefrom. Changing the light source is illustrated in FIG. 6. In the side view, the reactor housing 15 is shown with the cooling element 7 partially withdrawn out of the top.

The LEDs 11, in particular the rear side thereof, heats up during operation so that, in particular in order to provide a sufficiently high radiant power, appropriate cooling of the LEDs 11 is necessary. Because of the internal position of the light source 21 in the reactor housing 15, no air cooling, for example via appropriate cooling ribs, is possible or at least not sufficient. The cooling element 7 therefore has a coolant passageway 5, 17 via which a liquid coolant can be fed through the cooling element 7. Water cooling in particular can be provided in this manner. The coolant may be the water to be disinfected itself, which is fed in an appropriate circuit not only through the reactor chamber 16, but also through the coolant passageway 5, 17 before or after that. Likewise, however, an external cooling circuit with another coolant, which may also be water, may be provided.

A coolant inlet 3 and a coolant outlet 4 are provided in a common connection piece 1 at one end of the cooling element 7, which facilitates connection of a cooling circuit and therefore also the exchangeability of the UV light source 21. The coolant may be fed in through the inlet 3 into a first coolant passageway section 5 which is formed by an inboard tube with an open free end, which discharges into a second coolant passageway section 17 which runs in the cooling element 7 close to the rear side of the LEDs 11. After the coolant has flowed through the coolant passageway section 17 substantially along the entire length of the cooling element 7, it can be discharged through the outlet 4. This arrangement also allows air to escape easily from the coolant passageway.

The provision of water cooling means that a desired radiant power can be obtained so that, for example, an additional filter does not have to be disposed in the reactor 20. At the same time, however, this enables the UV light source 21 to be changed easily. The rod-shaped shape of the support element or cooling element 7 allows the UV LEDs 11 to be distributed in order to produce a homogeneous radiation field in the reactor chamber 16.

Figure 8:
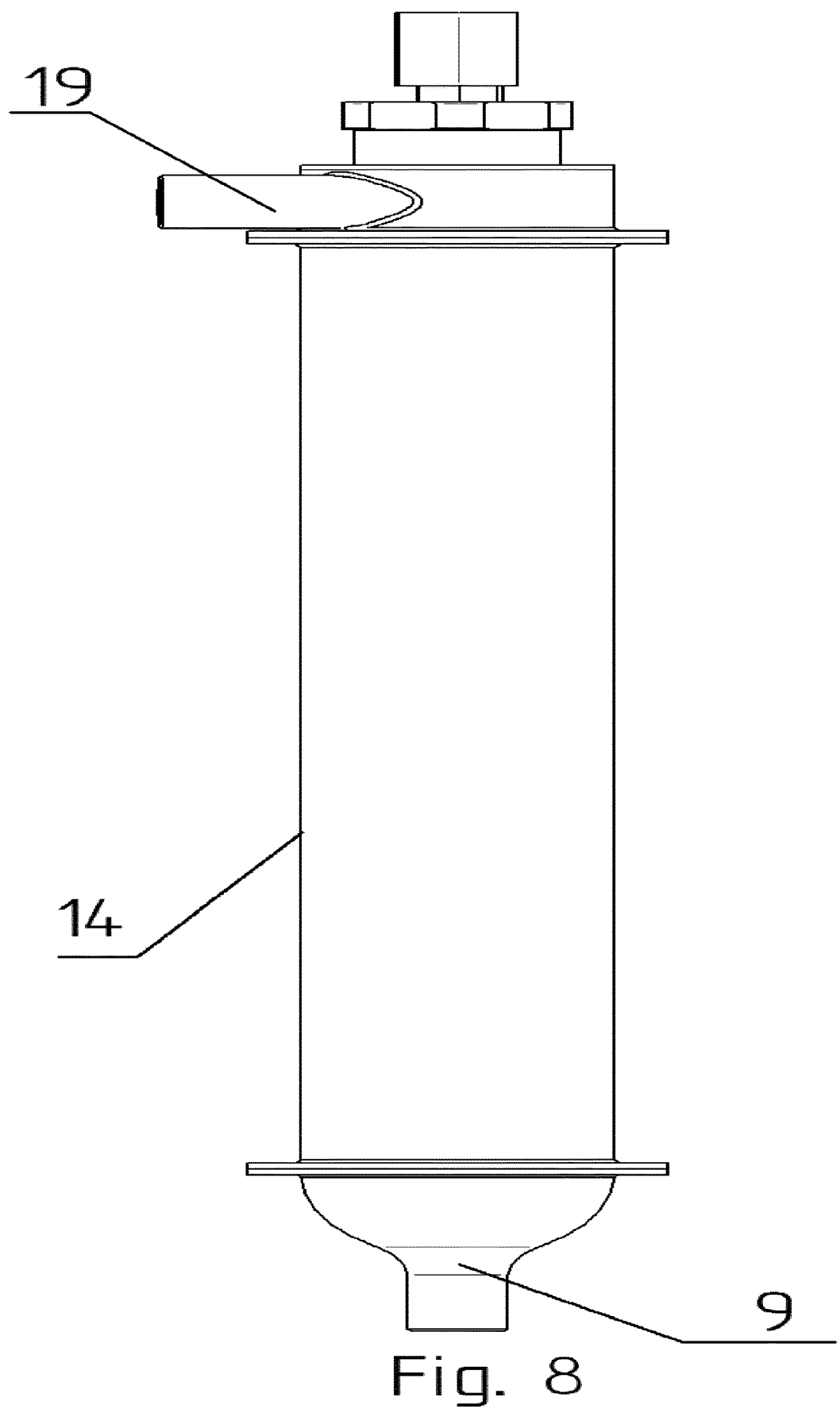
FIG. 8 shows a side view of a device for disinfecting a fluid in accordance with a second exemplary embodiment.
Figure 9:
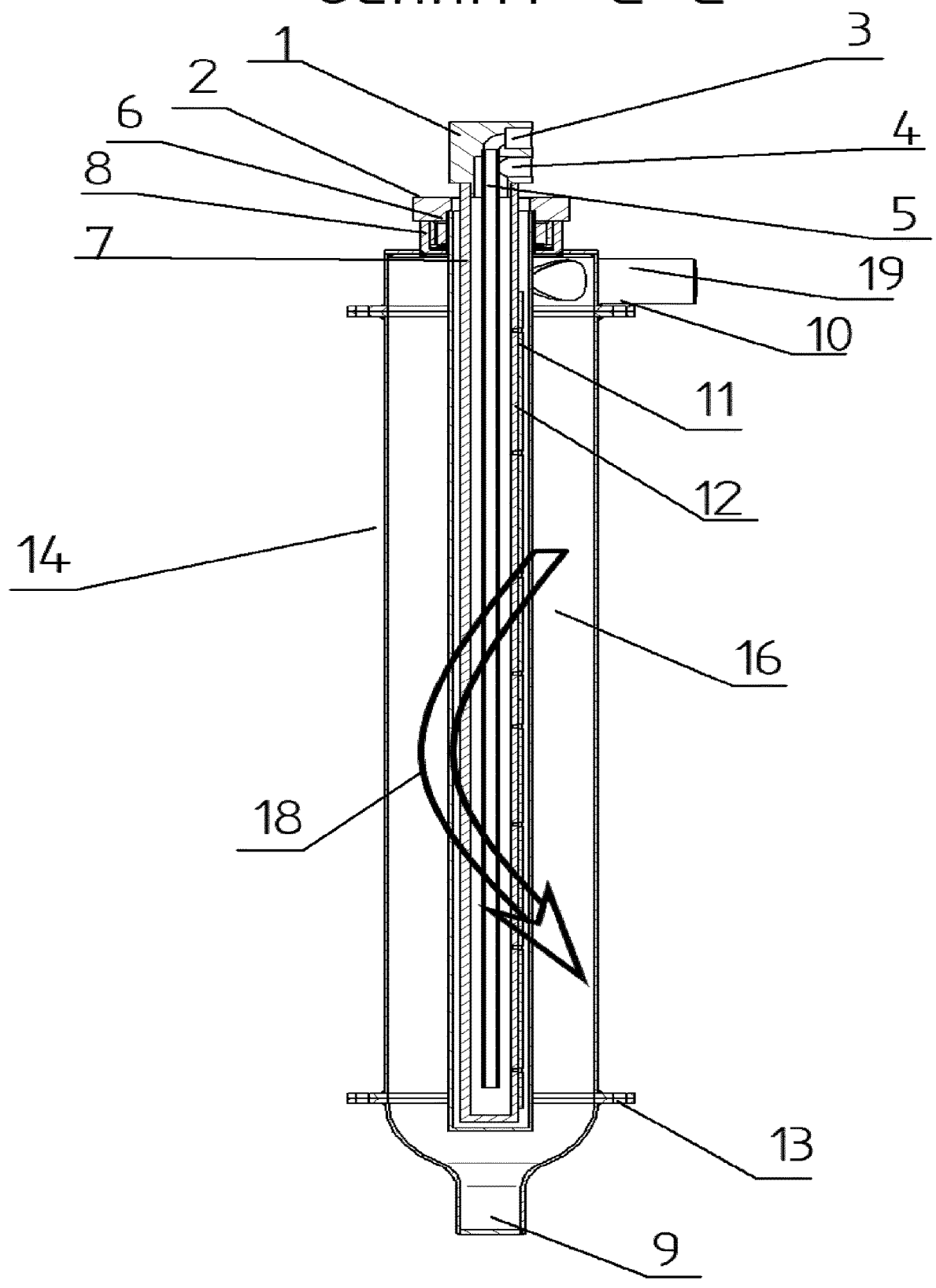
FIG. 9 shows a sectional view of the device of FIG. 8 along the longitudinal axis.

FIGS. 8 and 9 show a second exemplary embodiment of a device for disinfecting a fluid which is substantially identical to the first exemplary embodiment. In this regard, reference should be made to the description above. The second exemplary embodiment differs from the first exemplary embodiment only in the arrangement of the inlet and outlet and therefore in the flow in the reactor chamber 16. While the inlet 19 in the first exemplary embodiment is disposed at the bottom and the outlet 9 is disposed at the top and the fluid to be disinfected flows in and also out in a tangential direction, the inlet 19 in the second exemplary embodiment is at the top and the outlet 9 is at the bottom. It should be understood that in both exemplary embodiments, the inlet 19 and the outlet 9 may also be interchanged. In this manner, the water can flow from the top to the bottom or vice versa, depending on how the reactor 20 is connected up. At the same time, a horizontal arrangement of the entire reactor 20 is possible so that the water flows from left to right or vice versa.

The fluid to be disinfected flows in a tangential direction through the inlet 19 into the reactor chamber 16. However, the outlet 9 is disposed along the central longitudinal axis, so that the fluid flows straight downwards out of the reactor chamber 16. In order to improve the flow, in particular as regards the helical flow 18, the connection piece for the outlet 9 is rounded and forms a smooth transition. The cross section of the connection piece narrows continuously in the direction away from the reactor housing 15, wherein at the point of connection with the reactor housing 15, it corresponds to the cross section of the reactor housing 15 and at the free end to that of a connecting line, for example.

The invention claimed is:

1. A device for disinfecting a fluid, comprising:
   a reactor housing with an inlet for ingress and an outlet for discharge of a fluid to be disinfected;
   a reactor chamber which is formed in the reactor housing and is configured to receive the fluid to be disinfected so that the fluid flows through the reactor chamber along a flow path from the inlet to the outlet;
   a UV irradiation device with a plurality of UV light emitting diodes (LEDs);
   an elongated support element on which the UV LEDs are disposed and which is configured to extend at least partially into the reactor housing so that by means of the UV LEDs, UV light can be emitted into the reactor chamber in order to disinfect the fluid along the flow path; and
   a quartz glass tube which is configured to surround the support element in order to prevent direct contact of a fluid to be disinfected with the UV LEDs in the reactor chamber;
   wherein the support element is releasably and exchangeably mounted in the reactor housing and can be exchanged together with the quartz glass tube and has a coolant passageway which extends through the support element and through which a coolant can flow in order to cool the UV LEDs;
   the coolant passageway extends from a coolant inlet to a coolant outlet which are both disposed at the same end of the support element;
   the coolant passageway comprises a first section which extends from the coolant inlet and a second section which extends to the coolant outlet, wherein at least a portion of the first section runs inside the second section; and
   an external coolant circuit is provided for cooling, which is connected to the fluid to be disinfected via a heat exchanger in order to remove the heat in this manner.

2. The device as claimed in claim 1, wherein at least a portion of the support element is formed by a thermally conductive material, so that heat generated from the operation of the UV LEDs can be transferred to a coolant which flows through the coolant passageway.

3. The device as claimed in claim 1, wherein the support element is mounted in the reactor housing in a manner such that it extends inside at least a portion of the reactor housing at a distance from a reactor housing wall so that UV light from the UV LEDs can be emitted in the direction of the reactor housing wall.

4. The device as claimed in claim 3, wherein the support element extends along a central longitudinal axis of the reactor chamber.

5. The device as claimed in claim 1, wherein the support element extends in a longitudinal direction through the entire reactor housing.

6. The device as claimed in claim 5, wherein the support element is rod-shaped in configuration.

7. The device as claimed in claim 1, wherein
   the reactor housing is configured as a flow tube, and
   the inlet is disposed at a first end of the flow tube and the outlet is disposed at an opposite second end of the flow tube.

8. The device as claimed in claim 1, wherein at least one of the inlet and the outlet is disposed laterally on the reactor housing so that a fluid to be disinfected flows through the reactor chamber in a manner such that at least a portion of the flow path passes around the support element in a substantially spiral shape.

9. The device as claimed in claim 8, wherein both the inlet as well as the outlet are disposed laterally on the reactor housing in a manner such that a fluid to be disinfected flows into the reactor chamber in a direction which is at least partially tangential, or the other of the inlet and the outlet runs along a central longitudinal axis of the reactor chamber.

10. The device as claimed in claim 8, wherein the inlet or the outlet is formed in a corresponding connection piece which has a continuously varying cross sectional surface.

11. The device as claimed in claim 1, wherein at least a portion of a surface of the reactor housing bordering the reactor chamber is formed from a material which diffusely reflects UV light.

12. The device as claimed in claim 1, further comprising at least one UV sensor for detecting a radiation intensity for the UV light emitted by the UV LEDs as well as an analysis unit which is configured to control the radiation intensity as a function of a signal from the at least one UV sensor.

* * * * *